US007958631B2

(12) United States Patent
Hughes et al.

(10) Patent No.: US 7,958,631 B2
(45) Date of Patent: Jun. 14, 2011

(54) METHOD OF USING AN EXTENDER FOR A SEPARABLE INSULATED CONNECTOR

(75) Inventors: David Charles Hughes, Rubicon, WI (US); Paul Michael Roscizewski, Eagle, WI (US)

(73) Assignee: Cooper Technologies Company, Houston, TX (US)

( * ) Notice: Subject to any disclaimer, the term of this patent is extended or adjusted under 35 U.S.C. 154(b) by 670 days.

(21) Appl. No.: 12/082,719

(22) Filed: Apr. 11, 2008

(65) Prior Publication Data

US 2009/0255106 A1 Oct. 15, 2009

(51) Int. Cl.
*H06K 13/00* (2006.01)
*H01R 43/26* (2006.01)

(52) U.S. Cl. ............. 29/857; 29/854; 29/867; 29/564.4; 29/426.4

(58) Field of Classification Search .................. 29/426.4, 29/402.03, 402.04, 402.05, 402.06, 402.08, 29/402.09, 402.11, 402.12, 402.14, 402.19, 29/854, 857, 867, 868, 869, 876, 564.4, 866, 29/33 M; 439/181–187, 921
See application file for complete search history.

(56) References Cited

U.S. PATENT DOCUMENTS

| | | | |
|---|---|---|---|
| 1,903,956 A | 4/1933 | Christie et al. |
| 2,953,724 A | 9/1960 | Hilfiker et al. |
| 3,392,363 A | 7/1968 | Geis, Jr. et al. |
| 3,471,669 A | 10/1969 | Curtis |
| 3,474,386 A | 10/1969 | Link |
| 3,509,516 A | 4/1970 | Phillips |
| 3,509,518 A | 4/1970 | Phillips |
| 3,513,425 A | 5/1970 | Arndt |
| 3,539,972 A | 11/1970 | Silva et al. |
| 3,546,535 A | 12/1970 | Van Riemsdijk |
| 3,576,493 A | 4/1971 | Tachick et al. |
| 3,594,685 A | 7/1971 | Cunningham |
| 3,652,975 A | 3/1972 | Keto |
| 3,654,590 A | 4/1972 | Brown |
| 3,663,928 A | 5/1972 | Keto |
| 3,670,287 A | 6/1972 | Keto |
| 3,678,432 A | 7/1972 | Boliver |

(Continued)

FOREIGN PATENT DOCUMENTS

DE 3110609 10/1982

(Continued)

OTHER PUBLICATIONS

U.S. Appl. No. 11/809,508, Hughes et al.

(Continued)

*Primary Examiner* — Len Tran
*Assistant Examiner* — Babak Farrokh
(74) *Attorney, Agent, or Firm* — King & Spalding LLP (57) ABSTRACT

Removal of a conventional separable insulated connector from an electric power system often results in a shortened electric cable. An extender for a separable insulated connector enables the separable insulated connector to connect to a shortened cable. A conventional cable adapter is inserted into the extender, which includes a conductive connector for accepting the shortened cable and a conductive rod for carrying electric power from the shortened cable to the separable insulated connector. The extender also includes an inner semi-conductive layer that borders the conductive rod and compression connector, an outer semi-conductive layer, and a insulating layer between the two semi-conductive layers. The extender is inserted into a separable insulated connector, which is then connected to the electric power system.

20 Claims, 3 Drawing Sheets

U.S. PATENT DOCUMENTS

| | | | |
|---|---|---|---|
| 3,720,904 A | 3/1973 | De Sio | |
| 3,725,846 A | 4/1973 | Strain | |
| 3,740,503 A | 6/1973 | Tomohiro et al. | |
| 3,740,511 A | 6/1973 | Westmoreland | |
| 3,798,586 A | 3/1974 | Huska | |
| 3,826,860 A | 7/1974 | De Sio et al. | |
| 3,845,233 A | 10/1974 | Burton | |
| 3,860,322 A | 1/1975 | Sankey et al. | |
| 3,915,534 A | 10/1975 | Yonkers | |
| 3,924,914 A | 12/1975 | Banner | |
| 3,945,699 A | 3/1976 | Westrom | |
| 3,949,343 A | 4/1976 | Yonkers | |
| 3,953,099 A | 4/1976 | Wilson | |
| 3,955,874 A | 5/1976 | Boliver | |
| 3,957,332 A | 5/1976 | Lambert, III | |
| 3,960,433 A | 6/1976 | Boliver | |
| 4,029,380 A | 6/1977 | Yonkers | |
| 4,040,696 A | 8/1977 | Wada et al. | |
| 4,067,636 A | 1/1978 | Boliver et al. | |
| 4,088,383 A | 5/1978 | Fischer et al. | |
| 4,103,123 A | 7/1978 | Marquardt | |
| 4,107,486 A | 8/1978 | Evnas | |
| 4,113,339 A | 9/1978 | Eley | |
| 4,123,131 A | 10/1978 | Pearce, Jr. et al. | |
| 4,152,643 A | 5/1979 | Schweitzer | |
| 4,154,993 A | 5/1979 | Kumbera et al. | |
| 4,161,012 A | 7/1979 | Cunningham | |
| 4,163,118 A | 7/1979 | Marien et al. | |
| 4,186,985 A | 2/1980 | Stepniak et al. | |
| 4,203,017 A | 5/1980 | Lee | |
| 4,210,381 A | 7/1980 | Borgstrom | |
| 4,223,179 A | 9/1980 | Lusk et al. | |
| 4,260,214 A | 4/1981 | Dorn | |
| 4,343,356 A | 8/1982 | Riggs et al. | |
| 4,353,611 A | 10/1982 | Siebens et al. | |
| 4,354,721 A | 10/1982 | Luzzi | |
| 4,360,967 A | 11/1982 | Luzzi et al. | |
| 4,377,547 A * | 3/1983 | Hervig | 264/262 |
| 4,443,054 A | 4/1984 | Ezawa et al. | |
| 4,484,169 A | 11/1984 | Nishikawa | |
| 4,500,935 A | 2/1985 | Tsuruta et al. | |
| 4,508,413 A | 4/1985 | Bailey | |
| 4,568,804 A | 2/1986 | Luehring | |
| 4,600,260 A | 7/1986 | Stepniak et al. | |
| 4,626,755 A | 12/1986 | Butcher et al. | |
| 4,638,403 A | 1/1987 | Amano et al. | |
| 4,688,013 A | 8/1987 | Nishikawa et al. | |
| 4,700,258 A | 10/1987 | Farmer | |
| 4,715,104 A | 12/1987 | Schoenwetter et al. | |
| 4,722,694 A | 2/1988 | Makal et al. | |
| 4,767,894 A | 8/1988 | Schombourg | |
| 4,767,941 A | 8/1988 | Brand et al. | |
| 4,779,341 A | 10/1988 | Roscizewski | |
| 4,793,637 A | 12/1988 | Laipply et al. | |
| 4,799,895 A | 1/1989 | Borgstrom | |
| 4,820,183 A | 4/1989 | Knapp et al. | |
| 4,822,291 A | 4/1989 | Cunningham | |
| 4,834,677 A | 5/1989 | Archang | |
| 4,857,021 A | 8/1989 | Boliver et al. | |
| 4,863,392 A | 9/1989 | Borgstrom et al. | |
| 4,867,687 A | 9/1989 | Williams et al. | |
| 4,871,888 A | 10/1989 | Bestel | |
| 4,891,016 A | 1/1990 | Luzzi et al. | |
| 4,911,655 A | 3/1990 | Pinyan et al. | |
| 4,946,393 A | 8/1990 | Borgstrom | |
| 4,955,823 A | 9/1990 | Luzzi | |
| 4,972,049 A | 11/1990 | Muench | |
| 4,982,059 A | 1/1991 | Bestel | |
| 5,025,121 A | 6/1991 | Allen et al. | |
| 5,045,656 A | 9/1991 | Kojima | |
| 5,045,968 A | 9/1991 | Suzuyama et al. | |
| 5,114,357 A * | 5/1992 | Luzzi | 439/183 |
| 5,128,824 A | 7/1992 | Yaworski et al. | |
| 5,130,495 A | 7/1992 | Thompson | |
| 5,175,403 A | 12/1992 | Hamm et al. | |
| 5,213,517 A | 5/1993 | Kerek et al. | |
| 5,221,220 A | 6/1993 | Roscizewski | |
| 5,230,142 A | 7/1993 | Roscizewski | |
| 5,230,640 A * | 7/1993 | Tardif | 439/578 |
| 5,248,263 A | 9/1993 | Sakurai et al. | |
| 5,266,041 A | 11/1993 | De Luca | |
| 5,277,605 A | 1/1994 | Roscizewski et al. | |
| 5,356,304 A | 10/1994 | Colleran | |
| 5,358,420 A | 10/1994 | Cairns et al. | |
| 5,359,163 A | 10/1994 | Woodard | |
| 5,393,240 A | 2/1995 | Makal et al. | |
| 5,427,538 A | 6/1995 | Knapp et al. | |
| 5,429,519 A | 7/1995 | Murakami et al. | |
| 5,433,622 A | 7/1995 | Galambos | |
| 5,435,747 A | 7/1995 | Franckx et al. | |
| 5,445,533 A | 8/1995 | Roscizewski et al. | |
| 5,468,164 A | 11/1995 | Demissy | |
| 5,492,487 A | 2/1996 | Cairns et al. | |
| 5,525,069 A | 6/1996 | Roscizewski et al. | |
| 5,573,410 A * | 11/1996 | Stepniak | 439/88 |
| 5,589,671 A | 12/1996 | Hackbarth et al. | |
| 5,619,021 A | 4/1997 | Yamamoto et al. | |
| 5,641,310 A | 6/1997 | Tiberio, Jr. | |
| 5,655,921 A | 8/1997 | Makal | |
| 5,661,280 A | 8/1997 | Kuss et al. | |
| 5,667,060 A | 9/1997 | Luzzi | |
| 5,717,185 A | 2/1998 | Smith | |
| 5,736,705 A | 4/1998 | Bestel et al. | |
| 5,737,874 A | 4/1998 | Sipos et al. | |
| 5,747,765 A | 5/1998 | Bestel et al. | |
| 5,747,766 A | 5/1998 | Waino et al. | |
| 5,766,030 A | 6/1998 | Suzuki | |
| 5,766,517 A | 6/1998 | Goedde et al. | |
| 5,788,535 A * | 8/1998 | Stinsky et al. | 439/578 |
| 5,795,180 A | 8/1998 | Siebens | |
| 5,808,258 A | 9/1998 | Luzzi | |
| 5,816,835 A | 10/1998 | Meszaros | |
| 5,846,093 A | 12/1998 | Muench et al. | |
| 5,857,862 A | 1/1999 | Muench et al. | |
| 5,864,942 A | 2/1999 | Luzzi | |
| 5,912,604 A | 6/1999 | Harvey et al. | |
| 5,917,167 A | 6/1999 | Bestel | |
| 5,936,825 A | 8/1999 | DuPont | |
| 5,957,712 A | 9/1999 | Stepniak | |
| 6,022,247 A | 2/2000 | Akiyama et al. | |
| 6,040,538 A | 3/2000 | French et al. | |
| 6,042,407 A * | 3/2000 | Scull et al. | 439/181 |
| 6,130,394 A | 10/2000 | Hogl | |
| 6,168,447 B1 | 1/2001 | Stepniak et al. | |
| 6,213,799 B1 | 4/2001 | Jazowski et al. | |
| 6,220,888 B1 | 4/2001 | Correa | |
| 6,227,908 B1 | 5/2001 | Aumeier | |
| 6,250,950 B1 | 6/2001 | Pallai | |
| 6,280,659 B1 | 8/2001 | Sundin | |
| 6,332,785 B1 | 12/2001 | Muench, Jr. et al. | |
| 6,338,637 B1 | 1/2002 | Muench, Jr. et al. | |
| 6,362,445 B1 | 3/2002 | Mearchland et al. | |
| 6,364,216 B1 | 4/2002 | Martin | |
| 6,416,338 B1 | 7/2002 | Berlovan | |
| 6,504,103 B1 | 1/2003 | Meyer et al. | |
| 6,517,366 B2 | 2/2003 | Bertini et al. | |
| 6,520,795 B1 | 2/2003 | Jazowski | |
| 6,538,312 B1 | 3/2003 | Peterson et al. | |
| 6,542,056 B2 | 4/2003 | Nerstron et al. | |
| 6,566,996 B1 | 5/2003 | Douglass et al. | |
| 6,585,531 B1 | 7/2003 | Stepniak et al. | |
| 6,648,683 B2 * | 11/2003 | Youtsey | 439/578 |
| 6,674,159 B1 | 1/2004 | Peterson et al. | |
| 6,689,947 B2 | 2/2004 | Ludwig | |
| 6,705,898 B2 | 3/2004 | Pechstein et al. | |
| 6,709,294 B1 | 3/2004 | Cohen et al. | |
| 6,733,322 B2 | 5/2004 | Boemmel et al. | |
| 6,744,255 B1 | 6/2004 | Steinbrecher et al. | |
| 6,790,063 B2 | 9/2004 | Jazowski et al. | |
| 6,796,820 B2 | 9/2004 | Jazowski et al. | |
| 6,809,413 B1 | 10/2004 | Peterson et al. | |
| 6,811,418 B2 | 11/2004 | Jazowski et al. | |
| 6,830,475 B2 | 12/2004 | Jazowski et al. | |
| 6,843,685 B1 | 1/2005 | Borgstrom et al. | |
| 6,848,940 B2 | 2/2005 | Montena | |
| 6,905,356 B2 | 6/2005 | Jazowski et al. | |
| 6,936,947 B1 | 8/2005 | Leijon et al. | |

| | | | |
|---|---|---|---|
| 6,939,151 B2 | 9/2005 | Borgstrom et al. | |
| 6,984,791 B1 | 1/2006 | Meyer et al. | |
| 7,018,236 B2 | 3/2006 | Nishio et al. | |
| 7,019,606 B2 | 3/2006 | Williams et al. | |
| 7,044,760 B2 | 5/2006 | Borgstrom et al. | |
| 7,044,769 B2 | 5/2006 | Zhao et al. | |
| 7,050,278 B2 | 5/2006 | Poulsen | |
| 7,059,879 B2 | 6/2006 | Krause et al. | |
| 7,077,672 B2 | 7/2006 | Krause et al. | |
| 7,079,367 B1 | 7/2006 | Liljestrand | |
| 7,083,450 B1 | 8/2006 | Hughes | |
| 7,104,822 B2 | 9/2006 | Jazowski et al. | |
| 7,104,823 B2 | 9/2006 | Jazowski et al. | |
| 7,108,568 B2 | 9/2006 | Jazowski et al. | |
| 7,134,889 B2 | 11/2006 | Hughes et al. | |
| 7,150,098 B2 | 12/2006 | Borgstrom et al. | |
| 7,168,983 B2 | 1/2007 | Graf et al. | |
| 7,170,004 B2 | 1/2007 | Gramespacher et al. | |
| 7,182,647 B2 | 2/2007 | Muench et al. | |
| 7,212,389 B2 | 5/2007 | Hughes | |
| 7,216,426 B2 | 5/2007 | Borgstrom et al. | |
| 7,234,980 B2 | 6/2007 | Jazowski et al. | |
| 7,247,061 B2 | 7/2007 | Hoxha et al. | |
| 7,247,266 B2 | 7/2007 | Bolcar | |
| 7,258,585 B2 | 8/2007 | Hughes et al. | |
| 7,278,889 B2 | 10/2007 | Muench et al. | |
| 7,591,693 B2 | 9/2009 | Hughes | |
| 2001/0008810 A1 | 7/2001 | George et al. | |
| 2002/0055290 A1 | 5/2002 | Jazowski et al. | |
| 2003/0114045 A1* | 6/2003 | Montena | 439/578 |
| 2003/0228779 A1 | 12/2003 | Jazowski et al. | |
| 2004/0121657 A1 | 6/2004 | Muench et al. | |
| 2005/0208808 A1 | 9/2005 | Jazowski et al. | |
| 2005/0212629 A1 | 9/2005 | William et al. | |
| 2005/0260876 A1 | 11/2005 | Krause et al. | |
| 2006/0051499 A1* | 3/2006 | Balconi et al. | 427/117 |
| 2006/0110983 A1 | 5/2006 | Muench et al. | |
| 2006/0160388 A1 | 7/2006 | Hughes et al. | |
| 2006/0216992 A1 | 9/2006 | Hughes et al. | |
| 2007/0026713 A1 | 2/2007 | Hughes et al. | |
| 2007/0026714 A1 | 2/2007 | Hughes et al. | |
| 2007/0032110 A1 | 2/2007 | Hughes et al. | |
| 2007/0097601 A1 | 5/2007 | Hughes et al. | |
| 2007/0108164 A1 | 5/2007 | Muench et al. | |

FOREIGN PATENT DOCUMENTS

| | | |
|---|---|---|
| DE | 3521365 | 2/1987 |
| DE | 199069722 A1 | 2/1999 |
| EP | 0624940 | 11/1994 |
| EP | 0782162 A2 | 7/1997 |
| EP | 0957496 | 11/1999 |
| FR | 2508729 | 12/1982 |
| GB | 105227 | 2/1918 |
| GB | 2254493 | 10/1992 |
| JP | S62-198677 | 12/1987 |
| JP | S63-93081 | 6/1988 |
| JP | H1-175181 | 7/1989 |
| JP | H3-88279 | 9/1991 |
| JP | H4-54164 | 5/1992 |
| WO | WO 00/41199 | 7/2000 |

OTHER PUBLICATIONS

U.S. Appl. No. 11/738,995, Steinbrecher et al.
U.S. Appl. No. 11/738,948, Hughes et al.
U.S. Appl. No. 11/738,941, Hughes et al.
U.S. Appl. No. 11/688,673, Hughes et al.
U.S. Appl. No. 11/688,648, Hughes et al.
U.S. Appl. No. 11/677,703, Hughes et al.
U.S. Appl. No. 11/676,861, Hughes et al.
Loadbreak Apparatus Connectors Service Information 500-26, Cooper Power Systems, May 2003, Waukesha, WI.
Deadbreak Apparatus Connectors Electrical Apparatus, Cooper Power Systems, Jul. 1999, Marketing Material.
Link-Op 600A Operable Connector System, Marketing Material.
Installation Instructions, 650LK-B Link Operable Connector System (Bolted) May 1, 1989.
G&W Electric Co.; "Breakthrough in Switching Technology; Solid Dielectric Switchgear"; Oct. 2001; Blue Island, IL.
Cooper Power Systems; "Padmounted Switchgear; Type RVAC, Vacuum-Break Switch, Oil-Insulated or Sf.sub.6-Insulated; Electrical Apparatus 285-50"; Jul. 1998.
Cooper Power Systems; "Padmounted Switchgear; Type MOST Oil Switch; Electrical Apparatus 285-20"; Jul. 1998.
Cooper Power Systems; "Molded Rubber Products; 600 A 35 kV Class Bol-T.TM. Deadbreak Connector; Electrical Apparatus 600-50"; Jan. 1990.
Cooper Power Systems; "Padmounted Switchgear; Kyle.RTM. Type VFI Vacuum Fault Interrupter; Electrical Apparatus 285-10", Jan. 1998.
"Loadbreak Appatus Connectors, 200 A 25kV Class—Expanded Range Loadbreak Elbow Connector, Electrical Apparatus 500-28"; Cooper Power Systems; pp. 1-4; (Jan. 2004).
Kevin Fox, "The Cooper Posi-Break.TM. Solution to Separable Connector Switching Problems at Wisconsin Electric Power Company," Component Products, Bulletin No. 98065, copyright 1998 Cooper Power Systems, MI 10/98 5M, 2 total pages.
"The Cooper Posi-Break.TM., Elbow and Cap, Engineered Solution Increases Strike Distance and Improves Reliability," copyright 1998 Cooper Power Systems, Inc., Bulletin 98014, MI 398/15M, 6 total pages.
Loadbreak Apparatus Connectors, "200 A 25 kV Class Loadbreak Bushing Insert," Service Information 500-26, Cooper Power Systems, May 2003, pp. 1-2.
Loadbreak Apparatus Connectors, "200 A kV Class Cooper Posi-Break.TM. Expanded Range Loadbreak Elbow Connector," Service Information 500-29, Cooper Power Systems, Jan. 2004, pp. 1-4.
Product Brief, "Latched Elbow Indicator," Cooper Power Systems, Bulletin 94014, Apr. 1994, 1 total page.
"Stick-OPerable 600-Amp Connector Systems," *Elastimold, Amerace Corporation*, Feb. 1984, 11 pages.
"Molded Rubber Products, 600 A 15 kV Class T-OP™ II Deadbreak Connector Electrical Apparatus 600-12," *Cooper Power Systems*, Jul. 2005, pp. 1-4.
"Molded Rubber Products, 600 A 15 and 25 kV Deadbreak Accessories, Tools, Replacement Parts Electrical Apparatus 600-46"; *Cooper Power Systems*, Jul. 1997, pp. 1-4.
"Molded Rubber Products, 600 A 25 kV Class BT-TAP™ Deadbreak Connector Electrical Apparatus, 600-35," *Cooper Power Systems*, Mar. 2003, pp. 1-5.
"Deadbreak Apparatus Connectors, 600 A 15/25 kV Class Bol-T™ Deadbreak Connector Electrical Apparatus 600-10," *Cooper Power Systems*. Aug. 2002, 6 pages.
"Deadbreak Apparatus Connector, 600 A 25 kV Class Bushing Adapter for T-OP™ II Connector Systems (including LRTP and Bushing Extender) Electrical Apparatus 600-38," *Cooper Power Systems*, Jun. 1997, pp. 1-4.
"Loadbreak Apparatus Connectors, 200 A 15 kV Class Loadbreak Bushing Insert 500-12," *Cooper Power Systems*, Nov. 1995, pp. 1-2.
"T-OP™ II: How Many Sticks Does It Take To Operate Your 600 Amp Terminator System?," *Cooper Power Systems*, Jul. 1994, 4 pages.
"Installation & Operation Instructions 168ALR, Access Port Loadbreak Elbow Connectors"; Elastimold IS-168ALR (Rev C); pp. 1-5; (Feb. 1, 1994).
"Operating Instructions 200TC-2"; *Elastimold IS-200TC (Rev-A)*: pp. 1-2; (Feb. 26, 1995).
"Surge Arresters"; *Elastimold Catalog*; pp. 26-27; (2001).
"Surge Arresters, Metal Oxide Varistor elbow (M.O.V.E.™) Surge Arrester Electrical Apparatus 235-65"; *Cooper Power Systems*; pp. 1-4; Dec. 2003.
"Surge Arresters, Metal Oxide Elbow Surge Arrester Electrical Apparatus 235-65"; *Cooper Power Systems*; pp. 1-4; Jan. 1991.
"Surge Arresters, Metal Oxide Varistor (MOV) Parking Stand Surge Arrester Electrical Apparatus 235-68"; *Cooper Power Systems*; pp. 1-3; Apr. 2002.
"INJPLUG35, 35 kV Amp Loadbreak Injection Plug Operating and Installation Instructions"; *Cooper Power Systems*; p. 1; (Sep. 2002).
"Loadbreak Apparatus Connectors, 200 A 15 kV Class Loadbreak Elbow Connector, Electrical Apparatus 500-10"; *Cooper Power Systems*; pp. 1-4; (Feb. 2004).

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15kV Class Loadbreak Bushing Insert 500-12"; *Cooper Power Systems*; pp. 1-2; (Nov. 1995).

"Loadbreak Apparatus Connectors, 200 A 15kV Class Loadbreak Rotatable Feedthru Insert; Electrical Apparatus 500-13"; *Cooper Power Systems*; pp. 1-2; (Apr. 2001).

"Loadbreak Apparatus Connectors, 200 A 25 kV Class—Expanded Range Loadbreak Elbow Connector, Electrical Apparatus 500-28"; *Cooper Power Systems*; pp. 1-4; (Jan. 2004).

"Loadbreak Apparatus Connectors, 200 A 25 kV Class Rotatable Feedthru Insert, Electrical Apparatus 500-30"; *Cooper Power Systems*; pp. 1-2; (Jun. 1999).

"Loadbreak Apparatus Connectors, 200 A 35 kV Class Three-Phase Loadbreak Injection Elbow Installation Instructions, Service Information S500-55-2"; *Cooper Power Systems*; pp. 1-6; (Apr. 1999).

Cooper Power Systems, *Deadbreak Apparatus Connectors*, "600 A 15/25 kV Clas Bol-T™ Deadbreak Connector", Electrical Apparatus 600-30, pp. 1-6, Feb. 2003.

Cooper Power Systems, *Deadbreak Apparatus Connectors*, "600 A 15/25 kV Class Push-Op® Deadbreak Connector", Electrical Apparatus 600-33, pp. 1-4, Nov. 2004.

Cooper Power systems, *Molded Rubber Products*, "600 A 15/25 kV Class T-OP™ II Deadbreak Connector", Electrical Apparatus 600-32, pp. 1-4, Jul. 2005.

Cooper Power Systems, *OEM Equipment*, "Four-Position Sectionalizing Loadbreak Switches", Electrical Apparatus 800-64, pp. 1-8, Dec. 2003.

Elastimold® Catalog, Cable Accessories, PG-CA-0307, For 5kV-35kV Distribution Systems, Loadbreak & Deadbreak Seperable Connectors, Cable Joints, Cable Terminations, Product Selection Guide, © 2007, Thomas & Betts Corporation, 44 pages.

\* cited by examiner

METHOD OF USING AN EXTENDER FOR A SEPARABLE INSULATED CONNECTOR

RELATED PATENT APPLICATIONS

This patent application is related to co-pending U.S. patent application No. 12/082,717, entitled "Extender For A Separable Insulated Connector," filed Apr. 11, 2008, the complete disclosure of which is hereby fully incorporated herein by reference.

TECHNICAL FIELD

The invention relates generally to separable insulated connectors for electric power systems. More specifically, the invention relates to an extended separable insulated connector that can replace an existing separable insulated connector and to a method of installing the same in an electric power system.

BACKGROUND

Separable insulated connectors provide an electric connection between components of an electric power system. More specifically, separable insulated connectors typically connect sources of energy—such as cables carrying electricity generated by a power plant—to energy distribution systems or components thereof, such as switchgears and transformers.

Figure 1:
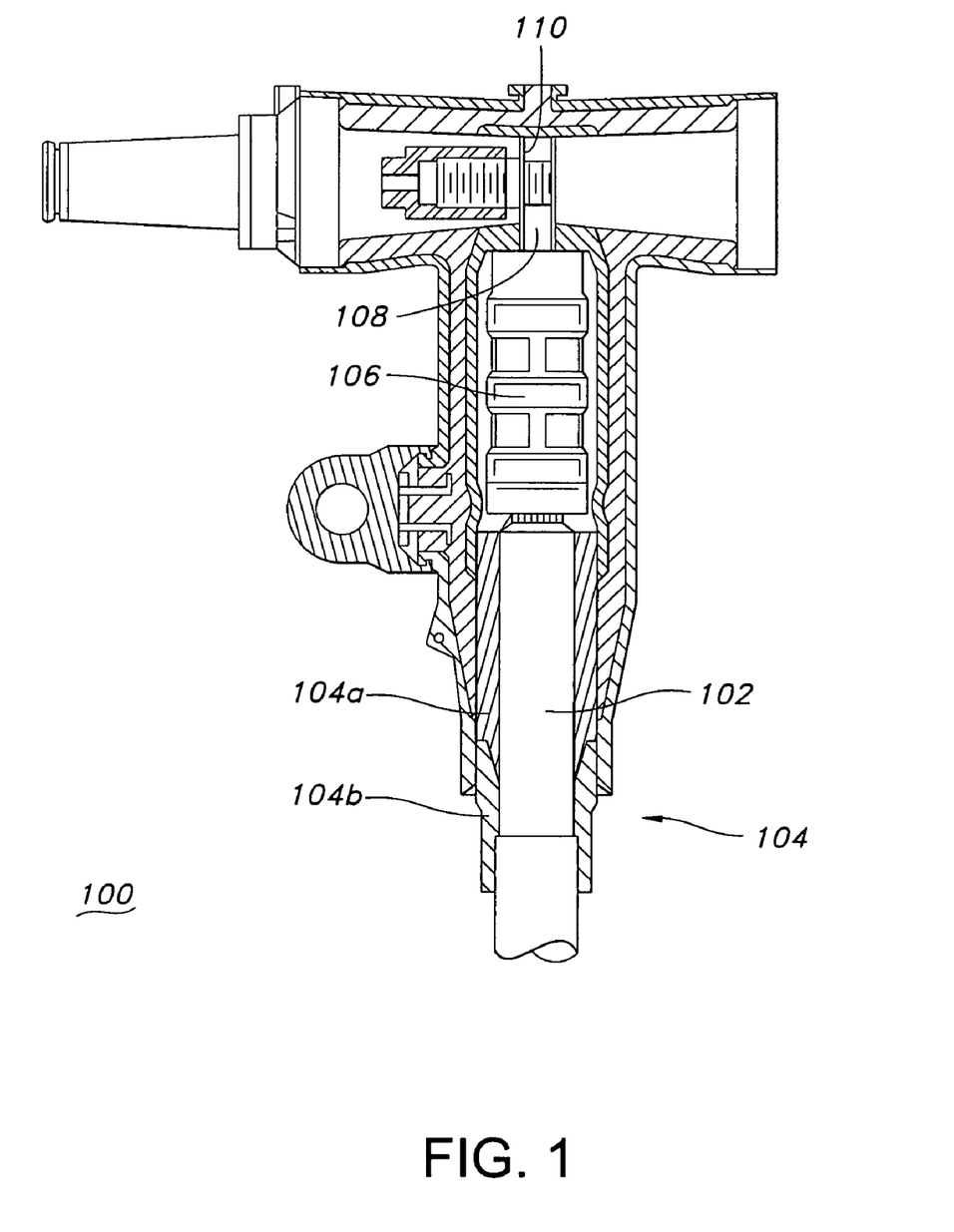
FIG. 1 is a cross-sectional side view of a conventional T-body connector with a conventional cable adapter disposed therein.
Figure 2:
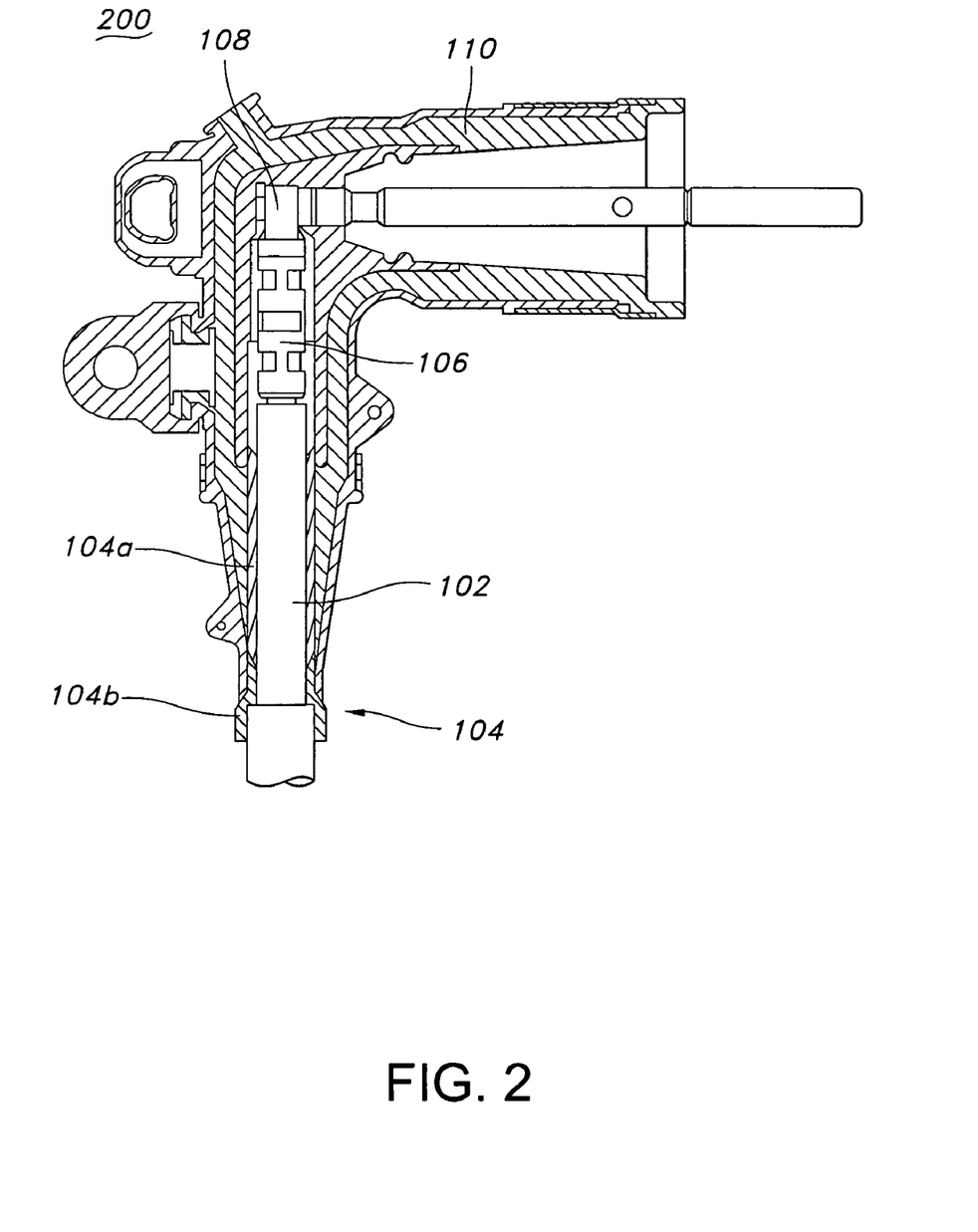
FIG. 2 is a cross-sectional side view of a conventional elbow connector with a conventional cable adapter disposed therein.

Two common types of separable insulated connectors that are used for this purpose are T-body connectors and elbow connectors. FIG. 1 depicts a conventional T-body connector 100, and FIG. 2 depicts a conventional elbow connector 200. As can be seen from FIGS. 1 and 2, the names of the two types of connectors describe their shapes.

Conventional elbow connectors 200 and T-body connectors 100 are installed into electric power systems according to similar steps. Thus the connections described and illustrated herein with respect to a conventional T-body connector 100, such as the one shown in FIG. 1, are largely applicable to a conventional elbow connector 200, such as the one shown in FIG. 2.

As illustrated in FIG. 1, a cable 102 is inserted into the bottom of a conventional T-body connector 100. The cable 102 is first inserted into a cable adapter 104, which is then inserted into the T-body connector 100. Conventional separable insulated connectors often use cable adapters 104 to increase the variety of cables that can be used with the connector. Each cable adapter 104 can be designed to accept a range of cable widths, each width within the range being sufficiently narrow to fit within the opening provided in the cable adapter 104 and sufficiently wide to be secured within the opening in the cable adapter 104. Each separable insulated connector can then be designed to accept a range of cable adapter 104 widths, thereby enabling each separable insulated connector to accept a large range of cable widths. Conventional cable adapters 104 can include an insulating material 104a and a semi-conductive material 104b, as shown in FIGS. 1 and 2.

Once the cable adapter 104 is inserted into the T-body connector 100, the cable 102 connects to the T-body 100 at a compression connector 106, which crimps the cable 102, holding it in place and allowing power to transfer from the cable 102 to the T-body 100. The compression connector 106 is in turn connected to an output extension 108 within a bushing 110. Then, the bushing 110 is connected to a switchgear, transformer, or other energy distribution component. Thus, the T-body 100 enables energy to be transferred from the cable 102 to an energy distribution system.

Separable insulated connectors, such as those shown in FIGS. 1 and 2 may need to be removed from the energy distribution system for a variety of reasons. One common reason is that the connectors sometimes fail, for example due to a power surge or a fault with the connection to the cable 102. Another reason is that the operators of the energy distribution system may want to change the type of switchgear or transformers to which the insulated connectors are connected, which could necessitate a change in the type of separable insulated connector required. Regardless of the reason for removing the separable insulated connectors, such removal and the subsequent replacement with another connector has traditionally been a difficult task.

One particular difficulty with removing a conventional separable insulated connector arises because the cable 102 cannot be readily disconnected from the compression connector 106. The compression connector 106 may be used only one time, because it is compressed around the cable 102. Thus, the cable 102 inserted into the connector must be cut at some point along a portion of the cable 102 that was not inserted into the connector before installing a replacement connector. Then, when installing the replacement connector, the cut cable 102 may be too short to reach the compression connector 106 in the replacement connector, which would connect to the switchgear, transformer, or other distribution component.

Conventionally, splices have been used to extend the length of a cut cable to connect the cable to the replacement separable insulated connector, thereby providing sufficient length for the separable insulated connector to maintain a connection with both the cable and the distribution component. However, using a splice for this purpose presents several difficulties. Splicing a cable first requires stripping the insulation on the end of the short cable and connecting it to a first end of a splice. Then, another section of similar cable, which will serve as the extension, must also be cut. Both ends of the extension cable must then be stripped, with one end being inserted into a second end of the splice, and the other end being inserted into the separable insulated connector. Thus, the task of splicing in an extension cable sufficient in length to reach the replacement connector requires three separate stripping and connection steps, each of which can be a labor intensive and error prone process.

An alternative method of connecting a cable that has been cut to a separable insulated connector is to use a separable insulated connector with a longer body. Such a connector may be designed to be sufficiently long to reach a cable that a conventional separable insulated connector could not, while still being able to connect to the distribution component. However, manufacturing separable insulated connectors with longer bodies (and varying lengths) requires investing in new molds that would be used to manufacture the connectors with such an increased length. The production, purchase, installation, and use of these molds would thus result in a significant cost.

Therefore, a need in the art exists for replacing a separable insulated connector in an electric power system that addresses the disadvantages found in the prior art. Specifically, a need in the art exists for connecting a replacement separable insulated connector to a cable with a short length without the labor intensive and error prone process of splicing an extension to the cable. A need in the art also exists for connecting a cable with a short length to a separable insulated connector that has a body of a standard length, so as not to require the costly investment of new molds and processes for manufacturing separable insulated connectors with longer bodies.

SUMMARY

The invention provides an efficient and cost effective method and device for replacing a separable insulated connector in an electric power system, and providing an electric connection between a cable and power distribution components. Specifically, the invention provides an extender for a separable insulated connector for connecting a cable that has been cut, or otherwise has a length insufficient to connect to a conventional separable insulated connector, to a power distribution system. The invention accomplishes this task without requiring either an extension cable to be spliced to the shortened cable or a separable insulated connector with a longer body.

Molding an extender for a cable adapter for use with a T-body or elbow connector is an easier task than molding an extended T-body or elbow connector for several reasons. First, an extender may typically be smaller in size than T-body or elbow connector bodies, and such an extender may therefore be even smaller than an extended T-body or elbow connector body. If the body of the T-body or elbow connector were lengthened, a larger press and mold base would be required. Second, an extender may typically have approximately cylindrical dimensions, as opposed to the shells of T-body or elbow connectors, which typically include additional sides, curves, holes, and angles, further complicating the design of the press and mold needed. Thus, manufacturing an extender may avoid the excessive financial and time investment in manufacturing longer T-body or elbow connectors.

Thus, in one aspect, the invention provides an extender for a standard separable insulated connector, such as a T-body connector or an elbow connector with a size and shape associated with conventional T-body and elbow connectors. The extender can extend the effective length of the separable insulated connector, such that the extender can connect to a conventional cable adapter, which in turn connects to a shortened cable. The extender can include the same or similar interfaces for a cable adapter that a separable insulated connector has, and thus, a conventional cable adapter may be connected to the extender in the same manner in which conventional cable adapters can connect to conventional separable insulated connectors. The extender's length enables it to be connected to a conventional cable adapter, and then inserted into a standard sized T-body or elbow connector, which can then be connected to a switchgear, transformer, or other distribution component. Then, the shortened cable can be connected to the cable adapter. Alternatively, the shortened cable can be connected to the cable adapter before the separable insulated connector is connected to the distribution components.

The extender for the separable insulated connector may include a compression connector (or any other type of suitable conductive connector) for accepting the shortened cable that is inserted into the cable adapter, a conductive rod connected to the compression connector for carrying electric power from the shortened cable to the T-body or elbow connector, and layers of semi-conductive material and insulating material. As used throughout this application, a "semi-conductive" material can refer to rubber or any other type of material that carries current, and thus can include conductive materials.

A shortened cable can be inserted into the cable adapter, which then can be connected to the extender. More particularly, the shortened cable can be inserted such that, once the cable adapter is inserted into the extender, the shortened cable is attached to the compression connector of the extender. Then, the extender, with the cable adapter and shortened cable connected therein, may be inserted into a conventional T-body or elbow connector, which can be connected to energy distribution systems or components thereof, such as switchgears and transformers.

Simply extending the length of a cable adapter, rather than providing a separate extender for the separable insulated connector, may not be sufficient to provide the necessary connection between the shortened cable and the T-body or elbow connector, because damage may result to an extended cable adapter if its components are not properly configured. The compression connector within cable adapters may be made of a conductive material. The compression connector should not touch any insulating material in the cable adapter because the insulating material could be damaged by the current passing through the compression connector. Air gaps between the compression connector and the insulating material could cause corona discharge if not shielded.

To avoid this problem, the compression connector of the extender may be bordered by a layer of semi-conductive material. This semi-conductive material can contact a semi-conductive insert or faraday cage disposed within the T-body or elbow connector. The purpose of a faraday cage is to shield all gaps of air within the mating components (such as the cable/cable adapter and the compression connector) of the separable insulated connector, as these air gaps can cause corona discharge within the connector. This discharge can occur if there is a voltage drop across the air gaps, and the discharge can corrode the rubber materials often used to make the separable insulated connector. The faraday cage ensures that the various mating components have the same electric potential, and thus prevents corona discharge within the mating components. The layer of semi-conductive material in the extender can act as a faraday cage if it contacts the semi-conductive insert of the separable insulated connector and becomes energized by the semi-conductive insert. The semi-conductive material need not touch the compression connector disposed within the extender. For example, there may be gaps of air between the compression connector and semi-conductive material.

The compression connector of the extender may contact a conductive rod, or any other suitable conductive material, for carrying electric power from the shortened cable to the T-body or elbow connector when the extender is connected to cable adapter and inserted into the T-body or elbow connector. When the extender is so inserted, the conductive rod may contact a compression connector within the T-body or elbow connector. The compression connector within the T-body or elbow connector may then contact an output extension, for providing electric power to a switchgear, transformer, or other energy distribution component to which the T-body or elbow connector is connected. Alternatively, the T-body or elbow connector may not include a separate compression connector, in addition to the compression connector of the extender. In such an embodiment, the conductive rod may contact an output extension within the T-body or elbow connector directly.

These and other aspects, features, and embodiments of the invention will become apparent to a person of ordinary skill in the art upon consideration of the following detailed description of illustrated embodiments exemplifying the best mode for carrying out the invention as presently perceived.

DETAILED DESCRIPTION OF EXEMPLARY EMBODIMENTS

The following description of exemplary embodiments refers to the attached drawings, in which like numerals indicate like elements throughout the several figures.

Figure 3:
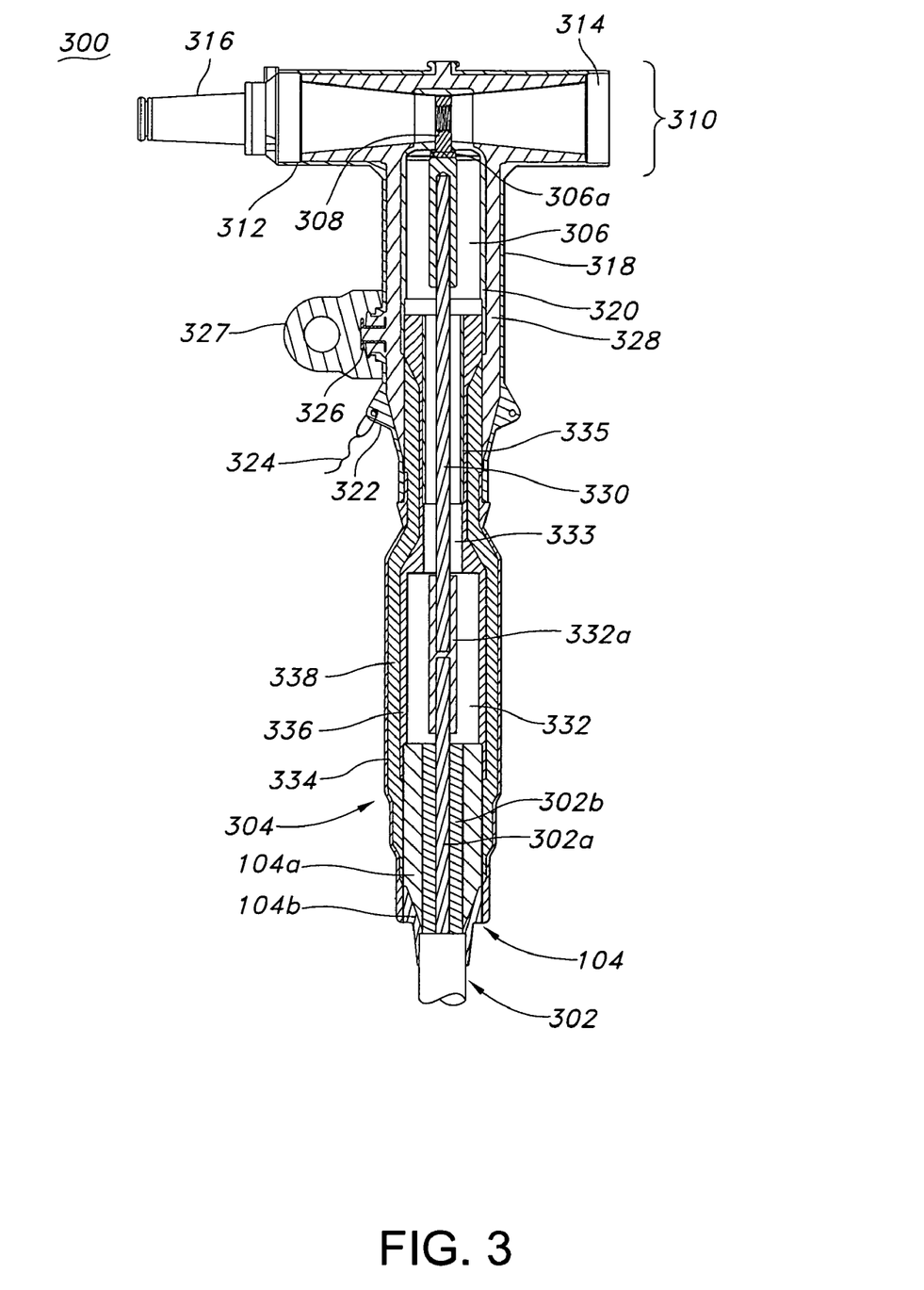
FIG. 3 is a cross-sectional side view of a T-body connector with an extender connected to a cable adapter disposed therein, according to an exemplary embodiment.

FIG. 3 is a cross-sectional side view of a T-body connector 300 with an extender 304 connected to a cable adapter 104 disposed therein, according to an exemplary embodiment. The cable adapter 104 disposed within the extender 304 can be similar or identical to the cable adapters 104 used with conventional T-body connectors 100. Additionally, the T-body connector 300 includes many of the features and components associated with conventional T-body connectors 100. For example, the T-body connector 300 includes an upper bushing section 310. The upper bushing section 310 of the T-body connector 300 includes a first opening 312 and a second opening 314. In exemplary embodiments, the first opening 312 can be used to attach the T-body connector 300 to a switchgear, transformer, or other energy distribution component to which the T-body connector 300 may be connected. In an exemplary embodiment, as shown in FIG. 3, a plug 316 or other similar bushing may be inserted into the first opening 312, and then the plug 316 may be inserted into an energy distribution component.

In various exemplary embodiments, the second opening 314 can be used as an access port to tighten a bolt that holds the plug 316 in the first opening 312 of the connector 300, to connect another device to the T-body connector 300, such as a device for measuring the electric flow through the T-body 300, or to connect the T-body 300 to another energy distribution component. Alternatively, the second opening 314 of the T-body 300 need not be connected to another device, and a protective cap may cover the second opening 314.

The T-body connector 300 also includes a shell 318 and a semi-conductive insert 320, both of which comprise a semi-conductive material. In exemplary embodiments, the shell 318 and the semi-conductive insert 320 can be made from a semi-conductive mixture of ethylene propylene dienemonomer (EPDM) rubber and carbon black.

In exemplary embodiments, as shown in FIG. 3, the shell 318 of the T-body 300 may also include a ground wire tab 322 to which a wire 324 may be attached and grounded. The semi-conductive EPDM rubber in the shell 318 can provide ground shield continuity for the T-body 300, thereby providing deadfront safety for the shell 318. In other words, the grounded shell 318 of the T-body 300 allows for operators to touch the exterior of the T-body connector 300 safely.

Additionally, in exemplary embodiments, the T-body connector 300 may include a capacitive test point 326. The capacitive test point 326 may be molded on the shell 318 of the T-body 300. The capacitive test point 326 provides a location on which a fault indicating device, or other similar device, can be mounted to determine whether problems or irregularities exist with the electric power passing through the T-body connector 300. In an exemplary embodiment, a protective cap 327 may be placed on the capacitive test point 326 when it is not in use.

As shown in FIG. 3, the T-body connector 300 also includes a layer of insulating material 328 between the shell 318 and the semi-conductive insert 320. In exemplary embodiments, the insulating material 328 also can include EPDM rubber. EPDM rubber serving as the insulating material 328 may not include carbon black or other conductive component, so that it may provide the necessary insulation and not conduct electricity.

The T-body connector 300 shown in FIG. 3 further includes a compression connector 306 that is connected to an output extension 308. In exemplary embodiments, the compression connector 306 can be similar or identical to the compression connector 106 used in conventional T-body connectors 100 utilizing conventional cable adapters 104. In alternative exemplary embodiments, any other suitable conductive connector may be used in place of the compression connector 306. The compression connector 306 can be substantially disposed within an opening in the semi-conductive insert 320. The output extension 308 can be disposed within an upper bushing section 310 of the T-body connector 300. In exemplary embodiments, the compression connector 306 can include a protrusion 306a that extends from the semi-conductive insert 320 and contacts the output extension 308. In alternative exemplary embodiments, the output extension 308 can contact the compression connector 306 within the semi-conductive insert 320.

The output extension 308 can comprise any suitable conductive material. Upon installation of the T-body connector 300, the output extension 308 is in electric communication with—and can carry electric power to—any switchgear, transformer, or other energy distribution component to which the T-body connector 300 may be connected. As shown in FIG. 3, in exemplary embodiments, the output extension 308 may contact a semi-conductive plug 316 or other bushing that has been inserted into the upper bushing section 310 of the T-body connector 300. The semi-conductive bushing or plug 316 then can be connected to the energy distribution component, thereby providing electric communication between the output extension 308 and the distribution component. In exemplary embodiments, as shown in FIG. 3, the output extension 308 can comprise a threaded connection for connecting to the energy distribution components or the semi-conductive bushing or plug 316.

The upper end of the compression connector 306 contacts the output extension 308. In exemplary embodiments, the lower end of the compression connector 306 disposed within the semi-conductive insert 320 can contact a conductive rod 330 or other suitable conductive material that carries electric power from an electric cable 302 connected to the cable adapter 104 and the extender 304. In an alternative embodiment, the conductive rod 330 can extend through the compression connector 306 and contact the output extension 308. In another alternative embodiment, the T-body connector 300 may not include an output extension 308, and instead, the conductive rod 330 can extend into the upper bushing section 310 of the T-body connector 300.

The semi-conductive insert 320 can provide a shield around the compression connector 306, thereby preventing electricity passing through the compression connector 306 from damaging the insulating material 328. As shown in FIG. 3, the semi-conductive insert 320 may, but need not, contact the compression connector 306 directly, as indicated by the presence of gaps of air between the compression connector 306 and the semi-conductive insert 320. Rather, the semi-conductive insert 320 needs only to provide semi-conductive material that is disposed between the insulating material 328 and the compression connector 306, thereby functioning as a faraday cage.

As shown in FIG. 3, the extender 304 can be inserted into the bottom end of the T-body connector 300. In exemplary embodiments, the extender 304 may include a conductive rod 330, such as a copper rod or any other suitable conductive rod or member, for carrying electricity from the shortened cable 302 to the T-body connector 300. In exemplary embodiments, the upper end of the rod 330 may contact the compression connector 306 disposed within the semi-conductive insert 320. In particular exemplary embodiments, the upper end of the rod 330 may comprise a terminal for contacting and connecting to the compression connector 306. As discussed previously, the compression connector 306 also contacts the output extension 308 of the T-body connector 300, thereby providing electric communication between the rod 330 and the output extension 308.

In alternative exemplary embodiments, the T-body connector 300 may not include a compression connector 306, or any other conductive connector, disposed within the shell 318. In such embodiments, a conductive rod 330 or other suitable conductive material that carries electric power from the shortened cable 302 may contact the output extension 308 directly. In exemplary embodiments, the rod 330 may comprise a terminal for contacting and connecting to the output extension 308 of the T-body connector 300.

The extender 304 shown in FIG. 3 further includes a conductive cable connector, such as a compression connector 332. In exemplary embodiments, the shortened cable 302 is inserted into the compression connector 332, which holds the shortened cable 302 securely, in a manner similar to the compression connector 106 used in conventional T-body connectors 100, such as the one shown in FIG. 1. In an exemplary embodiment, the extender 304 can include a channel 333 above the compression connector, through which the rod 330 can be inserted. Additionally, the extender 304 can include a support tube 335 within the channel 333, to help keep the channel 333 open and to help prevent it from collapsing.

The lower end of the rod 330 receives electricity from the compression connector 332, which receives electricity from the shortened cable 302. As shown in FIG. 3, the rod 330 and shortened cable 302 can be inserted into opposite ends of the conductive compression connector 332, thereby providing an electric connection between the rod 330 and cable 302. In exemplary embodiments, the shortened cable 302 may be stripped of a protective and/or semi-conductive sheath 302b to expose a conductive portion 302a of the cable 302, and then the conductive portion 302a of the shortened cable 302 may be inserted into the cable adapter 104, such that a portion of the cable 302 extends through an opening at the top of the cable adapter 104. Then, the cable adapter 104 can be inserted into the extender 304, and the cable 302 can be inserted into—or otherwise connected to—the compression connector 332 of the extender 304.

In alternative embodiments, the conductive rod (such as the rod 330) disposed within the extender 304 may include the conductive cable connector (such as the compression connector 332). In such embodiments, the rod 330 disposed within the extender 304 may be configured such that a cable 302 may be inserted therein.

Additionally, as shown in FIG. 3, the extender 304 can comprise two semi-conductive layers 334, 336, as well as an insulating layer 338. In exemplary embodiments, the extender 304 can comprise an inner semi-conductive layer 336, an insulating layer 338, and an outer semi-conductive layer 334. In exemplary embodiments, the semi-conductive layers 334, 336 can be made from a mixture comprising EPDM rubber and carbon black or other suitable conductive material. In alternative exemplary embodiments, various other suitable materials can be used for the semi-conductive layers 334, 336.

As shown in FIG. 3, the inner semi-conductive layer 336 may surround or border the rod 330. Additionally, as with the semi-conductive insert 320 discussed previously and the compression connector 306 disposed therein, the inner semi-conductive layer 336 can provide a shield around the compression connector 332 and the rod 330, thereby preventing electricity passing through the compression connector 332 and the rod 330 from damaging the insulating material 338. The inner semi-conductive layer 336 may, but need not, contact the compression connector 332 and the rod 330 directly, as long as it is disposed between the insulating material 338 and the compression connector 332 and the rod 330.

The inner semi-conductive layer 336 of the extender 304 is configured to contact the semi-conductive insert 320 of the T-body connector upon insertion of the extender 304 into the T-body connector 300. Electrical contact between the semi-conductive insert 320 and the inner semi-conductive layer 336 provides the necessary shield around the compression connector 332 the rod 330 and the compression connector 332. In alternative embodiments, the inner semi-conductive layer 336 can contact the conductive rod 330 and/or either of the compression connectors 306, 332, whether in addition to or instead of contacting the semi-conductive insert 320 to energize the inner semi-conductive layer 336 so that it can act as a faraday cage. If the inner semi-conductive layer 336 does not make electrical contact with the semi-conductive insert 320, conductive rod 330, or the compression connector 306, then there may be a significant voltage drop between the inner semi-conductive layer 336 and the compression connector 332 or the rod 330. Such a significant voltage drop could cause damage to the insulating layer 338 and could disturb the electricity flow from the shortened cable 302 through the T-body connector 300.

The insulating layer 338 of the extender 304 is disposed between the inner semi-conductive layer 336 and the outer semi-conductive layer 334. In exemplary embodiments, the insulating layer 338 can comprise the same material as the insulating material 328 used in the T-body connector 300. In particular exemplary embodiments, the insulating layer 338 can comprise EPDM rubber without carbon black or other conductive material mixed therein. In alternative exemplary embodiments, the insulating layer 338 may comprise various other suitable insulating materials known in the art.

The outer semi-conductive layer 334 of the extender 304 may border or surround the insulating layer 338. In exemplary embodiments, as shown in FIG. 3, the outer semi-conductive layer 334 may extend further below the insulating layer 338 and the inner semi-conductive layer 336.

The outer semi-conductive layer 334 is configured to contact the shell 318 of the T-body connector 300 upon insertion of the extender 304 into the T-body connector 300. Electrical contact between the shell 318 and the outer semi-conductive layer 334 provides for the outer semi-conductive layer 334 to provide ground shield continuity for the exposed portion of the extender 304. If the outer semi-conductive layer 334 does not make electrical contact with the shell 318, then it will not be connected to the ground wire 324 discussed previously.

Additionally, the outer semi-conductive layer 334 is configured to contact the semi-conductive material 104b of the cable adapter 104 upon insertion of the cable adapter 104 into the extender 304. Electrical contact between the shortened cable 302 and the semi-conductive material 104b of the cable adapter 104, which in turn is in electric contact with the outer semi-conductive layer 334, can provide ground shield continuity for the exposed portion of the extender 304, cable adapter 104, and the shortened cable 302. If the outer semi-conductive layer 334 does not make electrical contact with the shortened cable 302, then the shortened cable 302 may not be connected to the ground wire 324 discussed previously.

In an exemplary embodiment, as shown in FIG. 3, the extender 304 can be of approximately cylindrical shape (though, as shown, the diameter of the cylindrical shape can increase and decrease through the body of the extender 304) and have an interface into which the cable adapter 104 can be inserted. Thus, such an extender 304 can have an inner diameter (measuring the width of the hole through which the cable adapter 104 is inserted) and an outer diameter (measuring the width of the extender 304). In a particular exemplary embodiment, the inner semi-conductive layer 336 can run along the inner diameter, and additionally extend to the outer diameter towards the top of the extender 304, as shown in FIG. 3. This geometry and configuration can be helpful to ensure that the inner semi-conductive layer 336 contacts the semi-conductive insert 320 disposed within the shell 318.

One exemplary use of the T-body connector 300 with an extender 304 connected to a cable adapter 104 disposed therein will now be described with reference to FIGS. 1 and 3. As a person of ordinary skill in the art will recognize, variations of the exemplary steps described herein are possible.

After an operator of a power distribution system has made a decision to replace a conventional T-body connector 100 connected to a cable 102 via a cable adapter 104 on its lower end and a switchgear, transformer, or other energy distribution component on its upper end, the conventional T-body connector 100 must be removed. To do so, the source of power to the cable 102 may be turned off. Removal of the T-body connector 100 can begin with cutting a portion of the cable 102, thereby freeing the lower end of the conventional T-body 100. The upper end of the conventional T-body 100 can be unplugged or otherwise disconnected from the energy distribution component to which it was connected either before or after cutting the cable 102. In an exemplary embodiment, the conventional T-body connector 100 and cable adapter 104 can be discarded at this point.

After the cable 102 has been cut, the shortened cable 302 may be too short to connect to a replacement conventional T-body connector 100 that will be connected to the energy distribution component. Instead, the shortened cable 302 can be inserted into a replacement cable adapter 104, which may have approximately the same size and dimensions as the discarded cable adapter 104. Then, the cable adapter 104 can be inserted into an extender 104. The extender 304 selected can have dimensions appropriate for accepting the cable adapter 104 with the shortened cable 302 disposed therein, and for being disposed and held securely within the T-body connector 300 upon insertion.

In exemplary embodiments, prior to being inserted into the replacement cable adapter 104, the shortened cable 302 can be stripped of a portion of insulating material commonly found on such cables 302, thereby exposing a portion of the conductive part of the cable 302. The exposed portion of the shortened cable 302 then can be inserted into the cable adapter 104 such that the cable 302 extends through an opening in the cable adapter 104 and then connects to the compression connector 332 disposed within the extender 304. The compression connector 332 can hold the cable 302 securely, and can comprise a conductive material so that it can receive electricity carried by the shortened cable 302.

The upper end of the compression connector 332 can contact a rod 330, such as a copper rod or any other suitable conductive rod 330 or structure. The compression connector 332 and rod 330 can be connected such that once power to the system is turned on and electricity flows through the cable 302, the electricity carried by the shortened cable 302 and received by the compression connector 332 can be conducted to the rod 330.

After the shortened cable 302 is inserted into the cable adapter 104 and the cable adapter 104 is inserted into the extender 304, the extender 304 is inserted into the T-body connector 300. In alternative exemplary embodiments, the extender 304 may be inserted into the T-body connector 300 before the shortened cable 302 is inserted into the cable adapter 104, and then the cable adapter 104 is inserted into the extender 304. Other variations in the order of these steps are possible, and will be known to one of ordinary skill in the art having the benefit of the present disclosure.

In exemplary embodiments, the extender 304 is inserted into the T-body connector 300 such that the rod 330 of the extender 304 contacts the compression connector 306 disposed within the semi-conductive insert 320 of the T-body connector 300. The compression connector 306 is, in turn, in electrical contact with the output extension 308 of the T-body connector 300.

Furthermore, upon insertion of the extender 304 into the T-body connector 300, the inner semi-conductive layer 336 of the extender 304 contacts the semi-conductive insert 320 of the T-body connector 300, and the outer semi-conductive layer 334 of the extender 304 contacts the shell 318 of the T-body connector 300 and the semi-conductive material 104$b$ of the cable adapter 104. These connections provide for a shield around the compression connectors 306, 332 disposed within the T-body connector 300 and extender 304, and allow for the exterior of the T-body connector 300, extender 304, and cable adapter 104 to be grounded upon proper connection of a ground wire 324 to the ground wire tab 322.

The T-body connector 300 is then connected to the switchgear, transformer, or other energy distribution component to which the conventional T-body connector 300 had been connected. In exemplary embodiments, one end of a semi-conductive plug 316 or other bushing may be inserted into an opening 312, 314 in the upper bushing section 310 of the T-body connector 300, and then the other end of the semi-conductive plug 316 may be inserted into the energy distribution component.

After the T-body connector 300 has been connected to the energy distribution component, whether directly or through a semi-conductive plug 316, the energy distribution component should be in electric communication with the T-body connector 300, the output extension 308 disposed therein, the compression connector 306 disposed within the semi-conductive insert 320, the rod 330, the compression connector 332 disposed within the extender 304, and the shortened cable 302. The source of power to the shortened cable 302 can be turned on, thereby providing electricity from the cable 302, through the cable adapter 104, extender 304 and T-body connector 300, and to the energy distribution component, or in the opposite direction.

A person of ordinary skill in the art, having the benefit of the present disclosure, will recognize that variations of the exemplary embodiments described herein are possible. For example, though the extender 304 described with respect FIG. 3 is shown inserted into a T-body connector 300, extenders utilizing similar principles and technologies can be inserted into a variety of other separable insulated connectors. For example, as will be recognized by one of ordinary skill in the art having the benefit of the present disclosure, extenders can be used with elbow connectors, splices, or other separable insulated connectors. Such separable insulated connectors, similar to the T-body connector 300 of FIG. 3, can include a semi-conductive insert or faraday cage and a shell comprising semi-conductive material, insulating material between the semi-conductive insert and the shell, and a compression connector disposed within the semi-conductive insert.

Similarly, an extender can be configured to connect to the separable insulated connector according to the same or similar manner in which the extender 304 is connected to the T-body connector 300 described previously. Specifically, the extender can comprise an inner semi-conductive layer, an insulating layer, and an outer semi-conductive layer. Exemplary extenders can be configured such that when they are inserted into an elbow connector, splice, or other separable insulated connector, the inner semi-conductive layer can contact the semi-conductive insert, and the outer semi-conductive layer can contact the shell of the separable insulated connector.

Such exemplary extenders also can include a conductive rod. In alternative embodiments, extenders that can be used with a variety of separable insulated connectors may include any other suitable conductive structure for carrying electricity from a cable to the connector. One end of the conductive rod can receive electricity from the cable. Such extenders may further include a variety of conductive connectors, such as a compression connector, which can contact the conductive rod and the cable, thereby providing a connection between them.

Additionally, although the foregoing description describes an extender 304 that connects to a separable insulated connector on its top side and to a cable adapter 104 on its bottom side, other configurations are possible. For example, in view of these interfaces, a first extender can be inserted into a separable insulated connector, and then instead of a cable adapter being inserted into the first extender, a second extender can be inserted therein. Then, a cable adapter can be inserted into the second extender. Alternatively, any number of extenders may be connected to each other, thereby further increasing the ability of the extender to provide a connection between a separable insulated connector and a shortened cable. Such an arrangement can be possible because, as the foregoing description and the Figures indicate, the top side of an extender 304 can have interfaces identical or similar to the top side of a cable adapter 104, and the bottom side of an extender 304 can have interfaces identical or similar to the bottom side of a separable insulated connector such as a T-body connector 300.

In conclusion, the foregoing exemplary embodiments enable an extender 304 for a separable insulated connector—such as a T-body connector 300, elbow connector, splice, or any other suitable connector—that can be used with a cable adapter 104 (or other extender 304) disposed therein. Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

We claim:

1. A method for replacing a first separable insulated connector providing a connection between a cable and a distribution component with a second separable insulated connector, using an extender having a first end and a second end, comprising the steps of:
   cutting said cable, thereby leaving a shortened cable;
   removing said first separable insulated connector from said distribution component;
   inserting said shortened cable into a cable adapter;
   inserting said cable adapter into said first end of said extender comprising a conductor and a conductive cable connector, such that said shortened cable is in electric communication with said conductor;
   wherein said conductor being at least partially disposed within said conductive cable connector,
   inserting said second end of said extender into said second separable insulated connector, such that said conductor is in electric communication with said second separable insulated connector;
   and connecting said second separable insulated connector to said distribution component, such that said second separable insulated connector is in electric communication with said distribution component,
   wherein said second separable insulated connector comprises a semi-conductive insert,
   wherein said extender comprises an inner layer comprising a semi-conductive material, an outer layer comprising a semi-conductive material, and an insulating layer disposed between a portion of said inner layer and said outer layer, and
   wherein said conductive cable connector being disposed entirely within said inner layer,
   wherein said second separable insulated connector and said extender are configured such that, after inserting said second end of said extender into said second separable insulated connector, said inner layer contacts said semi-conductive insert.

2. The method of claim 1, wherein said extender has an inner diameter and an outer diameter, and
   wherein at least a portion of said inner layer extends from said inner diameter to said outer diameter.

3. The method of claim 1, further comprising the step of stripping a portion of insulation from said shortened cable, thereby leaving an exposed portion of said shortened cable, prior to inserting said shortened cable into said cable adapter.

4. The method of claim 1, further comprising the steps of:
   turning off power supplied to said cable prior to removing said first separable insulated connector from said distribution component; and
   turning on said power supplied to said cable after connecting said second separable insulated connector to said distribution component.

5. The method of claim 1, wherein said second separable insulated connector further comprises a shell, and
   wherein said second separable insulated connector and said extender are configured such that, after inserting said second end of said extender into said second separable insulated connector, said outer layer contacts said shell.

6. The method of claim 1, wherein at least one of said first separable insulated connector and said second separable insulated connector comprises one of a T-body connector, an elbow connector, and a splice.

7. A method for replacing a first separable insulated connector providing a connection between a cable and a distribution component with a second separable insulated connector, using an extender having a first end and a second end, comprising the steps of:
   cutting said cable, thereby leaving a shortened cable;
   removing said first separable insulated connector from said distribution component;
   inserting said shortened cable into a cable adapter;

inserting said cable adapter into said first end of said extender comprising a conductor and a conductive cable connector, such that said shortened cable is in electric communication with said conductor;

wherein said conductor being at least partially disposed within said conductive cable connector, inserting said second end of said extender into said second separable insulated connector, such that said conductor is in electric communication with said second separable insulated connector; and connecting said second separable insulated connector to said distribution component, such that said second separable insulated connector is in electric communication with said distribution component, wherein said extender comprises an inner layer comprising a semi-conductive material, an outer layer comprising a semi-conductive material, and an insulating layer disposed between a portion of said inner layer and said outer layer, wherein said conductive cable connector being disposed entirely within said inner layer, wherein said extender has an inner diameter and an outer diameter, and wherein at least a portion of said inner layer extends from said inner diameter to said outer diameter.

8. The method of claim 7, wherein said second separable insulated connector comprises a semi-conductive insert, and
wherein said second separable insulated connector and said extender are configured such that, after inserting said second end of said extender into said second separable insulated connector, said inner layer contacts said semi-conductive insert.

9. The method of claim 8, wherein said second separable insulated connector further comprises a shell, and wherein said second separable insulated connector and said extender are configured such that, after inserting said second end of said extender into said second separable insulated connector, said outer layer contacts said shell.

10. The method of claim 7, further comprising the step of stripping a portion of insulation from said shortened cable, thereby leaving an exposed portion of said shortened cable, prior to inserting said shortened cable into said cable adapter.

11. The method of claim 7, further comprising the steps of:
turning off power supplied to said cable prior to removing said first separable insulated connector from said distribution component; and
turning on said power supplied to said cable after connecting said second separable insulated connector to said distribution component.

12. The method of claim 7, wherein at least one of said first separable insulated connector and said second separable insulated connector comprises one of a T-body connector, an elbow connector, and a splice.

13. A method for replacing a first separable insulated connector providing a connection between a cable and a distribution component with a second separable insulated connector, using a first extender and a second extender having first and second ends comprising the steps of:
cutting said cable, thereby leaving a shortened cable;
removing said first separable insulated connector from said distribution component;
inserting said shortened cable into a cable adapter;
inserting said cable adapter into said first end of said first extender comprising a first conductor and a first conductive cable connector, such that said shortened cable is in electric communication with said first conductor;

wherein said first conductor being at least partially disposed within said first conductive cable connector, wherein said first extender comprises a first inner layer comprising a semi-conductive material, a first outer layer comprising a semi-conductive material, and a first insulating layer disposed between a portion of said first inner layer and said first outer layer, wherein said first conductive cable connector being disposed entirely within said first inner layer, inserting said second end of said first extender into said first end of said second extender comprising a second conductor and a second conductive cable connector, wherein said second conductor being at least partially disposed within said second conductive cable connector, wherein said second extender comprises a second inner layer comprising a semi-conductive material, a second outer layer comprising a semi-conductive material, and a second insulating layer disposed between a portion of said second inner layer and said second outer layer, wherein said second conductive cable connector being disposed entirely within said second inner layer, such that said first conductor and said shortened cable are in electric communication with said second conductor;

inserting said second end of said second extender into said second separable insulated connector, such that said second conductor is in electric communication with said second separable insulated connector; and connecting said second separable insulated connector to said distribution component, such that said second separable insulated connector is in electric communication with said distribution component.

14. The method of claim 13, wherein said first extender has a first inner diameter and a first outer diameter, and said second extender has a second inner diameter and a second outer diameter,
wherein at least a portion of said first inner layer extends from said first inner diameter to said first outer diameter, and wherein at least a portion of said second inner layer extends from said second inner diameter to said second outer diameter.

15. The method of claim 13, wherein said second separable insulated connector comprises a semi-conductive insert, and
wherein said second separable insulated connector and said second extender are configured such that, after inserting said second extender into said second separable insulated connector, said second inner layer contacts said semi-conductive insert.

16. The method of claim 15, wherein said second separable insulated connector further comprises a shell, and
wherein said second separable insulated connector and said second extender are configured such that, after inserting said second extender into said second separable insulated connector, said second outer layer contacts said shell.

17. The method of claim 16, wherein at least one of said semi-conductive insert and said shell comprises a mixture comprising ethylene propylene dienemonomer rubber and carbon black.

18. The method of claim 13, further comprising the step of stripping a portion of insulation from said shortened cable, thereby leaving an exposed portion of said shortened cable, prior to inserting said shortened cable into said cable adapter.

19. The method of claim 13, further comprising the steps of:
turning off power supplied to said cable prior to removing said first separable insulated connector from said distribution component; and turning on said power supplied to said cable after connecting said second separable insulated connector to said distribution component.

20. The method of claim 13, wherein at least one of said first separable insulated connector and said second separable insulated connector comprises one of a T-body connector, an elbow connector, and a splice.

* * * * *